United States Patent
Kerai

(10) Patent No.: US 10,477,370 B2
(45) Date of Patent: Nov. 12, 2019

(54) SYSTEM AND METHOD FOR LOW LATENCY WIRELESS CONNECTION

(71) Applicant: Dialog Semiconductor B.V., s-Hertogenbosch (NL)

(72) Inventor: Kanji Kerai, London (GB)

(73) Assignee: Dialog Semiconductor B.V., 'S-Hertogenbosch (NL)

(*) Notice: Subject to any disclaimer, the term of this patent is extended or adjusted under 35 U.S.C. 154(b) by 0 days.

(21) Appl. No.: 15/420,186

(22) Filed: Jan. 31, 2017

(65) Prior Publication Data

US 2018/0220258 A1 Aug. 2, 2018

(51) Int. Cl.
*H04W 4/80* (2018.01)
*H04W 76/15* (2018.01)
*H04L 29/12* (2006.01)
*H04W 84/20* (2009.01)

(52) U.S. Cl.
CPC ............. *H04W 4/80* (2018.02); *H04W 76/15* (2018.02); *H04L 61/6022* (2013.01); *H04W 84/20* (2013.01)

(58) Field of Classification Search
CPC ..... H04W 4/008; H04W 72/02; H04W 84/12; H04W 28/0215; H04W 28/08; H04W 40/246; H04W 4/005; H04W 72/0453; H04W 72/0486; H04W 74/002; H04W 76/002; H04W 76/025; H04W 80/02; H04W 88/06; H04W 8/005; H04W 12/06; H04W 24/02; H04B 1/715; H04B 17/318; H04B 1/005; H04B 1/0053; H04B 1/0057; H04B 1/7143; H04B 2001/7154; H04B 5/00; H04B 5/0012; H04B 5/0031
See application file for complete search history.

(56) References Cited

U.S. PATENT DOCUMENTS

| | | | |
|---|---|---|---|
| 9,635,495 B2 | 4/2017 | Kwan et al. | |
| 2005/0220135 A1* | 10/2005 | Honda | H04B 1/7143 370/437 |
| 2009/0034498 A1* | 2/2009 | Banerjea | H04W 76/15 370/338 |
| 2016/0302058 A1* | 10/2016 | Mestanov | H04L 61/2038 |
| 2016/0345173 A1* | 11/2016 | Shirakawa | G06F 21/335 |
| 2017/0034856 A1* | 2/2017 | Takeuchi | H04W 76/002 |
| 2018/0054319 A9* | 2/2018 | Yazdiha | H04W 76/14 |

* cited by examiner

*Primary Examiner* — Golam Sorowar
(74) *Attorney, Agent, or Firm* — Saile Ackerman LLC; Stephen B. Ackerman

(57) ABSTRACT

A method of establishing a low latency connection between a first device and a second device on a wireless network is presented. The method contains the steps of: forming a first wireless connection between the first and second devices; forming at least a second and parallel wireless connection between the first and second devices; and sending data between the first and second devices using at least the first and second connections. For any wireless protocol for data exchange between devices that specifies a minimum interval between data exchange events, the present disclosure enables a lower latency than would otherwise be achievable according to a standard protocol.

12 Claims, 1 Drawing Sheet

SYSTEM AND METHOD FOR LOW LATENCY WIRELESS CONNECTION

TECHNICAL FIELD

The present disclosure relates to establishing a low latency wireless connection between two devices. In particular, but not exclusively, the present disclosure relates to establishing a low latency Bluetooth Low Energy (BLE) connection between two devices.

BACKGROUND

There are many practical applications involving a wireless network where it is desirable to have the lowest connection latency possible. Connection Latency is defined as the time taken for the transport of data from one device to another. One example of where low connection latency is required is within a gaming context where a handheld controller is wirelessly connected to a main console unit. Such applications typically require an overall latency of the wireless connection to be 5 ms or less. If the latency is greater, the user may notice the delay between pressing a command button on the controller and the response within the game. Another example where low latency is important is a virtual reality (VR) system with a wirelessly connected VR headset. Typically, game console and VR system providers use specialised firmware, hardware and/or software for establishing a low latency connection.

One popular protocol for wireless connectivity is Bluetooth. A recent version of this is the Bluetooth Low Energy (BLE) standard, also referred to as Bluetooth Smart. Its operation is defined by various standards and specifications which are managed by the Bluetooth Special Interest Group. Given the ubiquitous nature of Bluetooth connectivity, it is desirable that low latency connection can be established using the Bluetooth or BLE protocol.

However, the BLE specification defines a connection model for BLE with a minimum connection interval of 7.5 ms. The purpose of this minimum connection interval is to save power, which is a key objective of the BLE standard. The advantage of having a relatively long connection interval is that significant power is saved, since a device can sleep most of the time between connection events. The disadvantage is that if a device has data that it needs to send, it must wait until the next connection event. A shorter connection interval provides more opportunity for data to be sent or received, as the two devices will connect more frequently.

Under the BLE standard (low power method), and using the minimum connection interval, two devices cannot connect and exchange data more frequently than every 7.5 ms. For a high power solution, the BLE specification defines a method that enables both connected devices to continue sending and receiving (using the More Data bit) but this is not practical for a battery operated handheld device. For applications such as gaming, the amount of data that needs to be sent (the payload) is typically small, such as a handheld controller transmitting data representing the pressing of a command button or movement of the VR handheld unit.

The BLE standard defines two device roles at the Link Layer for a connection: the master device and the slave device. These are the devices that act as initiator and advertiser respectively during creation of the connection. A master device can manage multiple simultaneous connections with different slave devices, whereas each slave device can only be connected to one master device. Thus, a network can be formed which comprises a master device and multiple slave devices, and this is called a piconet.

Within the network, each slave device has its own unique media access control address (MAC address). This is a device identifier assigned to network interfaces for communications at the data link layer of a network segment. It is possible to change the MAC address on most modern hardware and many network interfaces (including wireless ones) support changing their MAC address.

SUMMARY

According to a first aspect of the present disclosure there is provided a method of establishing a low latency wireless connection between a first device and a second device, the method comprising the steps of: forming a first wireless connection between the first and second devices; forming at least a second and parallel wireless connection between the first and second devices; and sending data between the first and second devices using at least the first and second connections.

Optionally, the wireless connection is established on a BLE network.

Optionally, the method includes offsetting the start time of successive connection events by an offset time period.

Optionally, the offset time period between consecutive connection intervals is substantially equal to the ratio of the connection interval and the number of wireless connections.

Optionally, the offset time period between consecutive connection intervals is around 0.5 ms.

Optionally, the first device comprises a master device and the second device comprises a slave device, and wherein the slave device has a first device identifier.

Optionally, the first device identifier comprises a first MAC address.

Optionally, the slave device adopts a second device identifier after forming of the first wireless connection and prior to forming of the second wireless connection.

Optionally, the slave device adopts a new device identifier for each wireless connection.

Optionally, the master device combines the data sent using a plurality or all of the parallel wireless connections, and processes the combined data.

According to a second aspect of the present disclosure there is provided a system of wirelessly connected devices, the system comprising: a first device and a second device; wherein the system is configured to provide a first wireless connection between the first and second devices and to provide at least a second and parallel wireless connection between the first and second devices, and wherein data is sendable between the first and second devices using at least the first and second wireless connections.

Optionally, the system is configured to wirelessly connect the first and second devices using a BLE network.

Optionally, the system is configured to offset a start time of successive connection events by an offset time period.

Optionally, the offset period between consecutive connection intervals is substantially equal to the ratio of the connection interval and the number of wireless connections.

Optionally, the first device comprises a master device and the second device comprises a slave device, and wherein the slave device has a first device identifier.

Optionally, the first device identifier comprises a first MAC address.

Optionally, the system is configured to specify a second device identifier for the slave device prior to forming the second wireless connection.

Optionally, the system includes a multiplexer for combining the data sent using a plurality or all of the parallel wireless connections.

According to a third aspect of the present disclosure there is provided a master device which is wirelessly connectable to a slave device, the master device comprising: a radio transceiver which is configured to provide a first wireless connection between the master device and slave device, wherein the radio transceiver is configured to provide a second and parallel wireless connection between the master device and the slave device, and wherein data is sendable between the master device and the slave device using at least the first and second wireless connections.

According to a fourth aspect of the present disclosure there is provided a slave device which is wirelessly connectable to a master device, the slave device comprising: a radio transceiver which is configured to provide a first wireless connection between the master device and slave device, wherein the radio transceiver is configured to provide a second and parallel wireless connection between the master device and the slave device, and wherein data is sendable between the master device and the slave device using at least the first and second wireless connections.

BRIEF DESCRIPTION OF THE DRAWINGS

The disclosure will be described below, by way of example only, with reference to the accompanying drawings, in which.

DESCRIPTION

BLE is defined in various standards documents, including for example the "Specification of the Bluetooth System", Covered Core Package version 4.2, Volumes 1-7, which are hereby incorporated by reference.

Figure 1:
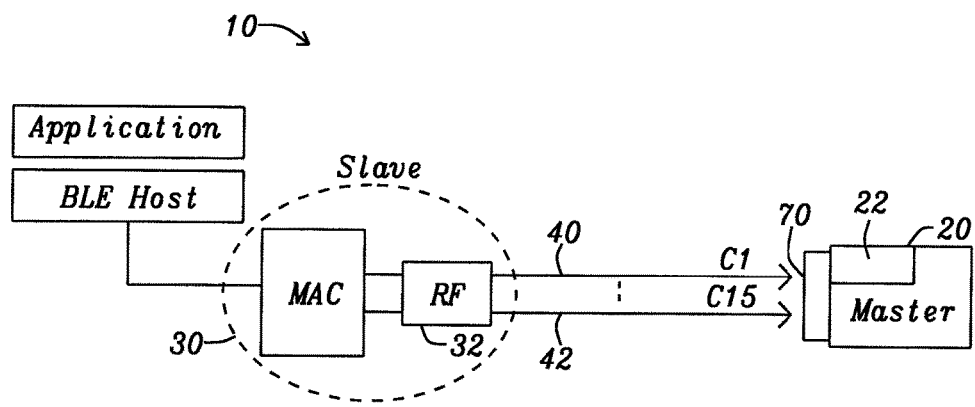
FIG. 1 is a schematic view of a system comprising two wirelessly connected devices.

FIG. 1 shows a system 10 comprising two devices which are wirelessly connected via a BLE network. Bluetooth enabled devices are "peer units" in that they are able to act as either a master or a slave device. However, when a piconet is formed between two or more devices, one device takes the role of 'master', and all other devices assume a 'slave' role. In FIG. 1, a first device is acting as the master device 20 while a second device is acting as the slave device 30.

According to the BLE standard, the master device 20 determines the time instants in which the slave device 30 is required to listen, and thus coordinates the medium access by using a Time Division Multiple Access (TDMA) scheme. The master device 20 also provides the slave device 30 with the information needed for frequency hopping when transmitting data and for the connection supervision. The parameters for the management of a connection are transmitted in a Connection Request message.

Once a connection between the master and slave devices has been created, data channel protocol data units (PDUs) are exchanged during the course of a connection event. Connection events occur at regular time intervals spaced by a time period called a connection interval. During a connection event, at least an Inter Frame Space (IFS) of 150 µs must pass between the end of the transmission of a data PDU and the start of the next one. If none of the devices has more data to transmit, the connection event will be closed and the slave device 30 will not be required to listen until the beginning of the next connection event. For a new connection event, master and slave devices use a new data channel frequency, which is computed using the frequency hopping algorithm.

Therefore, the Link Layer only transmits data during connection events. During a connection event, the master and slave devices alternate sending and receiving data packets. To aid clarity, only data sent from the slave device 30 to the master device 20 is considered and described in the present disclosure.

The master device 20 includes an RF transceiver 22 for wirelessly transmitting and receiving data. The master device 20 could be, for example, a main console of a gaming system. The slave device 30 also includes an RF transceiver 32 for wirelessly transmitting and receiving data. The slave device 30 may be, for example, a handheld controller of the gaming system.

The RF transceivers and software installed on both the master device 20 and the slave device 30 are used to form a first wireless connection 40 between the devices. Indeed, the system 10 is configured to form multiple parallel wireless connections between the two devices, and data is sent between the devices using all of the formed wireless connections.

In the present embodiment, fifteen parallel connections between the master device 20 and the slave device 30 are formed (in FIG. 1, only the first and fifteenth wireless connections 40, 42 are shown for clarity).

Multiple connections between a master and a slave device are achieved using the following.

As is conventional, the slave device 30 has a first device identifier in the form of a first MAC address. The first wireless connection 40 is formed between the two devices according to the standard BLE protocol with the slave device 30 using this MAC address. As part of the connection procedure, a first connection interval 50 is specified by the master device 20. The connection interval may be in the range of 7.5 ms to 4.0 s. In this embodiment, it is set to the minimum possible time period of 7.5 ms.

After forming the first connection 40, the slave device 30 adopts a new, second MAC address. The master and slave devices 20, 30 then connect again to form a second wireless connection. As before, a connection interval of 7.5 ms is set by the master device 20 for the second wireless connection.

Effectively, the master device 20 acts conventionally when making the second connection, as if it were connecting to a second device (such as a second handheld controller). No changes are required to the Bluetooth hardware and software stack in the master device 20.

The slave device 30 also does not require any physical modification. All necessary modifications can be implemented at the link layer.

The master device 20 and slave device 30 continue to make new connections, with the slave device 30 adopting a new MAC address prior to making each wireless connection. For each connection, a connection interval of 7.5 ms is set by the master device 20.

Figure 2:
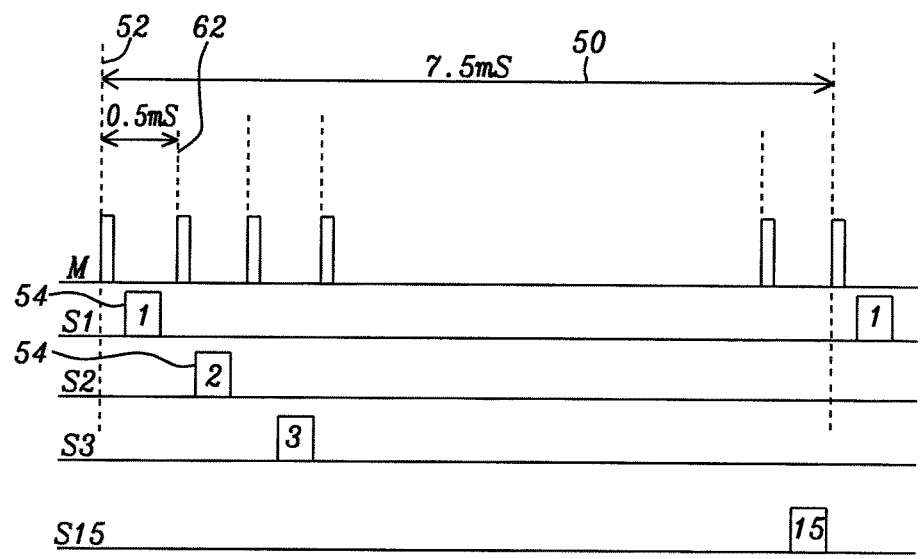
FIG. 2 is a timeline diagram showing the timing of connection events for the devices of FIG. 1.

As part of the connection procedure, the master device 20 offsets the start time 62 of the second connection event (for the second wireless connection) relative to the start time 52 of the first connection event 50 (for the first wireless connection). This is shown in FIG. 2. This is in a similar manner to the conventional situation in which the master device 20 is scheduling the timing for the transmission of data from multiple slave devices. The master device 20 offsets the start time of each subsequent connection event by the same time period. When all of the wireless connections have been made, the timing of the connection events associated with each of the wireless connections is staggered as shown in FIG. 2, with an offset time period between each successive connection event.

For cases where a connection interval is the same for each of the plurality of parallel connections, the offset time period between the start points of successive connection intervals is determined from the ratio of the connection interval and the number of wireless connections. Thus, for the present embodiment which uses a connection interval of 7.5 ms and 15 connections, the offset time period is 0.5 ms. As stated above, in a gaming context a handheld controller typically only needs to transmit a small data payload to represent a button press or other event and so 0.5 ms is quite sufficient for sending the data.

In operation, when a user presses a command button of the slave device 30, the data 54 representing the button press is stored in a buffer of the slave device 30 until the next available connection event. If the button is pressed, say, at or just before start time 52 of a first connection event, the data 54 will be sent using the first wireless connection 40. If the button is pressed between the start time 52 of the first connection event and the start time 62 of the second connection event, the data 54 will be sent using the second wireless connection. A similar approach is used for later times in that any waiting data 54 is sent after the next available connection event, regardless of which wireless connection is used. This next available connection event will always be within the next 0.5 ms from when the button press is detected. Therefore, the maximum time between the button press and the sending of the data 54 representing the button press will be the offset time period. The offset time period therefore represents the maximum connection latency that will be experienced, which in the present embodiment is 0.5 ms.

Consider the conventional case where a single slave device 30 is connected to a master device 20 using a 7.5 ms connection interval. If a user presses a command button of the slave device 30 just after the connection event for the slave device 30, the data 54 representing the button press will be stored in a buffer of the slave device 30 until the next connection event which takes place in the next connection interval. Therefore, there will be a delay of nearly 7.5 ms (plus additional processing delay in software) before the master device 20 reconnects to the slave device 30 and the data 54 is transmitted. The user may notice such a delay.

Returning to the disclosure, the master device 20 includes a multiplexer 70 (shown in FIG. 1) which receives the data 54 sent using all of the parallel wireless connections and presents it to a host as being associated with a single slave device. The master device 20 then processes the data. Therefore, a single physical device can in effect masquerade as several devices with multiple parallel connections, so that a lower effective latency can be achieved as compared with the minimum latency associated with a protocol for wireless data exchange.

The present embodiment establishes fifteen wireless connections and uses the minimum connection interval possible under the BLE standard. In other embodiments, fewer wireless connections or more wireless connections can be made. A greater number of connections decreases the offset time period and therefore provides an even smaller connection latency. A lesser number of connections increases the offset time period and therefore also increases the connection latency but this could be useful when greater payloads are to be transmitted. Similarly, using a connection interval greater than the minimum possible increases the connection latency but allows the transmittal of greater payloads. There is also a saving in the power consumed. The number of wireless connections and the choice of connection interval can be optimised for the particular requirements of the application involved.

As a further variation, the connection interval does not have to be the same for all of the parallel connections which are established.

The present disclosure overcomes a limitation of the Bluetooth standard to provide low latency connection over a Bluetooth network. The approach of the disclosure is low power, flexible and can be optimised for a particular application. The invention is within the BT-SIG qualification process and does not violate Bluetooth specification and testing.

The disclosure is relatively straightforward to implement and does not require any physical modification of the slave device 30. The only physical modification to the master device 20 is the use of a multiplexer 70. The modifications to the master device 20 and the slave device 30 can be made using firmware updates. Similarly, for any wireless protocol for data exchange between devices that specifies a minimum interval between data exchange events, the present disclosure enables a lower latency than would otherwise be achievable according to a standard protocol. Examples of other wireless protocols include ZigBee LPWAN, and other Bluetooth versions both past and future.

Various modifications and improvements can be made to the above without departing from the scope of the disclosure.

What is claimed is:

1. A method of establishing a low latency wireless connection between a master device and a slave device, the method comprising the steps of:
    forming a first wireless connection between the master and slave devices according to a BLE network protocol;
    after forming of the first wireless connection, adopting a different MAC address for the slave device;
    after adopting the different MAC address, forming at least a second and parallel wireless connection between the master and slave devices according to said BLE network protocol; and
    sending data from the slave device to the master devices using at least the first and second connections.

2. The method as claimed in claim 1, including offsetting the start time of successive connection events by an offset time period.

3. The method as claimed in claim 2, wherein the offset time period between consecutive connection intervals is substantially equal to the ratio of the connection interval and the number of wireless connections.

4. The method as claimed in claim 2, wherein the offset time period between consecutive connection intervals is around 0.5 ms.

5. The method as claimed in claim 1, where in the master device combines the data sent using a plurality or all of the parallel wireless connections, and processes the combined data.

6. A system of wirelessly connected devices, the system comprising:
    a master device and a slave device;
    wherein the system is configured to provide a first wireless connection between the master and slave devices according to a BLE network protocol and then to provide at least a second and parallel wireless connection between the master and slave devices according to said same BLE network protocol, wherein the slave device adopts a different MAC address for each of said first and second wireless connections; and wherein data is sendable between the master and slave devices using at least the first and second wireless connections.

7. The system as claimed in claim 6, wherein the system is configured to offset a start time of successive connection events by an offset time period.

8. The system as claimed in claim 7, wherein the offset period between consecutive connection intervals is substantially equal to the ratio of the connection interval and the number of wireless connections.

9. The system as claimed in claim 7, wherein the offset time period between consecutive connection intervals is around 0.5 ms.

10. The system as claimed in claim 6, including a multiplexer for combining the data sent using a plurality or all of the parallel wireless connections.

11. A master device which is wirelessly connectable to a slave device, the master device comprising:
a radio transceiver which is configured to provide a first wireless connection between the master device and slave device according to a BLE network protocol,
wherein the radio transceiver is configured to provide a second and parallel wireless connection between the master device and the slave device according to said BLE network protocol,
wherein the slave device adopts a different MAC address for said each of said first and second wireless connections; and
wherein data is sendable between the master device and the slave device using at least the first and second wireless connections.

12. A slave device which is wirelessly connectable to a master device, the slave device comprising:
a radio transceiver which is configured to provide a first wireless connection between the master device and slave device according to a BLE network protocol,
wherein the radio transceiver is configured to provide a second and parallel wireless connection between the master device and the slave device according to said same BLE network protocol,
the slave device is configured to specify a second MAC address prior to forming the second wireless connection; and
wherein data is sendable between the master device and the slave device using at least the first and second wireless connections.

* * * * *